INVENTOR.
STANLEY D. ROBERTSON
BY
Ernest L. Brown
ATTORNEY

INVENTOR.
STANLEY D. ROBERTSON
BY
Ernest L. Brown
ATTORNEY

United States Patent Office 3,162,805

Patented Dec. 22, 1964

3,162,805

FUNCTION GENERATOR

Stanley D. Robertson, La Mirada, Calif., assignor to North American Aviation, Inc.

Filed Sept. 29, 1961, Ser. No. 141,901
15 Claims. (Cl. 323—94)

This invention pertains to a means for generating a signal which is a predetermined function of the angle of a shaft. More particularly, the device of this invention uses the planar Hall effect in thin ferro-magnetic films to generate voltages which are predetermined functions of the angle of rotation of a shaft.

It is frequently desirable (for example in the analog computer art) to generate voltages which are predetermined functions of the angular position of a shaft. It is customary to use potentiometers or resolvers to generate such functions.

It is an object of this invention to use a planar Hall effect in thin ferro-magnetic films to generate voltages which are predetermined functions, particularly linear and sinusoidal functions, of the rotation of a shaft.

A galvano-magnetic effect in semiconductor thin films is described by C. Goldberg and R. E. Davis, in the Physical Review, volume 94, page 1121 (1954). Goldberg and Davis called their discovery a planar Hall effect because the applied magnetic field, the current flowing through the material, and the generated Hall field lie all in the same plane.

It has been predicted by Madelung in the Encyclopedia of Physics, volume 20, page 76 (1957), that such an effect should not exist in metals.

The invention described and claimed herein is based upon the discovery that such a planar Hall effect can be produced in conductive ferro-magnetic thin films.

A thin ferro-magnetic film has an internal magnetization which is parallel to the surface of the film. The film may be formed in such a way that it has a hard direction of magnetization, and a perpendicularly oriented relaxed or easy direction of magnetization. If the internal magnetization is normally in the relaxed direction, and a magnetic field which has a component parallel to the surface of the film and perpendicular to the internal magnetization (but which has no component anti-parallel to the internal magnetization) is applied to the film, the direction of the internal magnetization is rotated toward the direction of the magnetic field. If the magnetic field has sufficient intensity to align the magnetization parallel to the field, the field is said to saturate the film. When the magnetic field is removed, the magnetization rotates back to its relaxed or easy direction.

If the internal magnetization happens to be rotated ninety degrees from its relaxed or easy direction when the magnetic field is removed, the internal magnetization may assume either polarity along the easy direction. Because the resulting polarity would not be known, the magnetic field should not be removed when the internal magnetization is ninety degrees from its relaxed position.

If a spurious magnetic field has a component within the surface of the film anti-parallel to the internal magnetization, the direction of magnetization may reverse by wall movement of the domain which fractures the domain rendering the film less useful as a function generator.

When a current is conducted across the film from one edge to an opposite edge, due to the resistance of the film a voltage gradient, called an offset voltage gradient, is created in the current direction. Curves of equipotential offset voltage everywhere perpendicular to the flow lines of the current, may be found on the surface of the film. Voltages generated by the planar Hall effect may be measured between any two points on different current flow lines. However, if the measurements are not made between two points on the same above mentioned equipotential line, a component of offset voltage is measured with the Hall voltage.

It is frequently desirable to measure only the Hall voltage. The simplest way is to choose a first output terminal on a first equipotential line and a first current flow line. Then choose a pair of terminals on a second flow line, one on each side of said first equipotential line. A potentiometer is then connected across the last mentioned pair of terminals. The potentiometer is adjusted until no offset voltage or a predetermined offset voltage appears between the first output terminal and the tap on the potentiometer. The tap is the second output terminal.

When the internal magnetization is neither parallel nor perpendicular to the current flow, a Hall-effect voltage may be observed between two terminals on different flow lines of the current. When the internal magnetization is perpendicular or parallel to the current flow, no Hall voltage appears between the terminals. If the current density is uniform and constant in direction through the film, continuous rotation of the internal magnetization causes a planar Hall-effect voltage, which is a sinusoidal function of the angle through which the internal magnetization has turned, to appear between the above mentioned output terminals.

It is contemplated in accordance with this invention to rotate the internal magnetization of a thin ferro-magnetic film in response to the rotation of a shaft. A pair of magnets (permanent or electromagnets) are attached to rotate with a shaft and to apply an external field to the ferro-magnetic thin film to cause the internal magnetization of the film to rotate with the externally applied magnetic field.

By varying the uniformity of the current flowing through the sheet of the ferro-magnetic film, or by varying the thickness of the film, or both, the shape of the voltage function which appears at the output of the planar Hall generator may be varied. By making the current direction and intensity substantially uniform, the voltage which appears at the output terminals will be a sinusoidal function of the angle of rotation of the shaft.

When the externally applied magnetic field is sufficiently intense to saturate the film, the Hall voltage appearing at the output terminals is a sinusoidal function of twice the angle of rotation of the shaft.

When the externally applied magnetic field is too weak to saturate the film, the output voltage is a sinusoidal function of the angle of rotation of the shaft. The device should be shielded so no external fields, such as the earth's field, affect the output voltage.

By using a pair of planar Hall generators which have their current flows angularly displaced relative to each other by an angle of 45°, within a saturating field, both a sinusoidal and a cosinusoidal voltage can be generated at the same time whereby the device may be used as a resolver.

By limiting the motion of the magnets to a substantially linear portion of the function curve, and by using a stepped-up gear ratio—for example, twenty to one—a voltage which is a substantially linear function of the shaft rotation may be generated by the Hall generator.

By using electromagnets rather than permanent magnets, and by turning the electromagnets to a predetermined angle with the internal magnetizations relaxed direction, the voltage which appears at the output terminals of the Hall generator may be reduced to zero or to some other predetermined value by removing the magnetic field at any predetermined or programmed time.

It is therefore an object of this invention to use the planar Hall effect in thin ferro-magnetic films to generate a voltage which is a function of a shaft rotation.

It is another object of this invention to use the planar Hall effect in thin ferro-magnetic films to generate voltages which are sinusoidally related to the position of a shaft.

It is also an object of this invention to provide a novel resolver.

It is a more particular object of this invention to provide structure which accomplishes the above named objects.

Other objects will become apparent from the following description taken in connection with the accompanying drawings in which.

Figure 1:
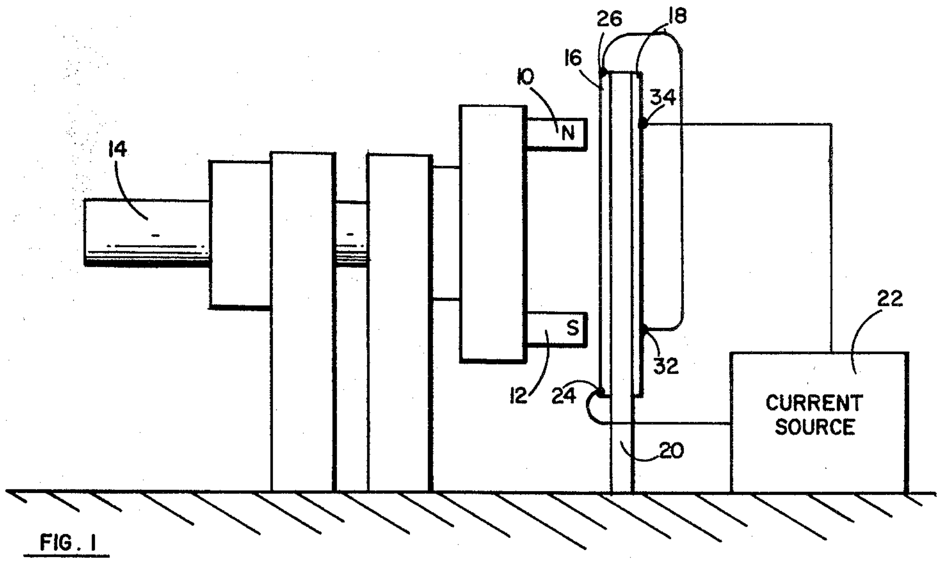
FIG. 1 is a profile view of a device of this invention adapted and positioned to generate both a sinusoidal and a cosinusoidal voltage with respect to rotation of a shaft.
Figure 2:
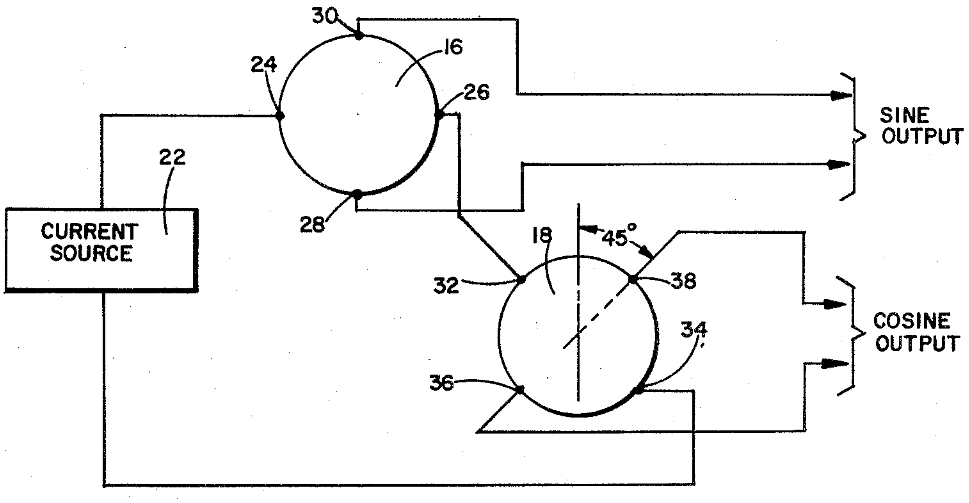
FIG. 2 is a schematic diagram of the electrical connections to the planar Hall generator of the device of FIG. 1.

In the device of FIGS. 1 and 2 a pair of permanent magnets 10 and 12 are carried by and are symmetrically positioned across a diameter of a rotatable shaft 14.

A pair of very thin ferro-magnetic films 16 and 18, whose planes are perpendicular to the axis of rotation of shaft 14, are positioned within the field of magnets 10 and 12, so that the magnetic field is in the plane of the film, as is required to produce a planar Hall-effect.

The thickness of the films used in this invention (for example, films 16 and 18) may be as thin as desired and up to several thousand angstroms. The thinner the film, the stronger the planar Hall signal.

Magnetic films 16 and 18 are fabricated of ferro-magnetic material, i.e., material in the ferro-magnetic families of iron, nickel, cobalt, and manganese, or alloys of these materials. One preferable alloy is an alloy approximately 20% iron and 80% nickel which has a substantially square hysteresis loop.

Films 16 and 18 should preferably be fabricated with a single magnetic domain. If more than one domain is present, the output voltage is reduced.

Thin films 16 and 18 are mounted upon a supporting structure 20 within the magnetic field of permanent magnets 10 and 12. The supporting structure 20 is electrically nonconducting and is preferably of a material, such as glass, which has good dimensional stability.

The magnetic field strength of magnets 10 and 12 should (in the preferred embodiment) be sufficiently high to saturate the internal magnetization of films 16 and 18.

To generate a planar Hall voltage, a current source 22 is connected to opposing edges of films 16 and 18 to cause the current to be conducted in a sheet with a substantially uniform distribution and a direction from one edge to the other of said films. Referring to FIG. 2, a current flows from terminal 24 to terminal 26 within film 16 and from terminal 32 to 34 within film 18. The direction of current flow in each of films 16 and 18 is preferably in the easy or perpendicular to the easy directions of magnetization of each of said films.

Output terminals 28 and 30 and output terminals 36 and 38 are shown positioned upon films 16 and 18, respectively to allow planar Hall voltages to be measured without an offset voltage component. Terminals 28 and 30 are shown (in FIG. 2) positioned upon a line which bisects a line drawn between terminals 24 and 26. The voltage between terminals 28 and 30 due to the flow of current from terminal 24 through the resistance of film 16 to terminal 26 is zero, i.e. there is no offset voltage between terminals 28 and 30.

Similarly there is no offset voltage between terminals 36 and 38.

Figure 4:
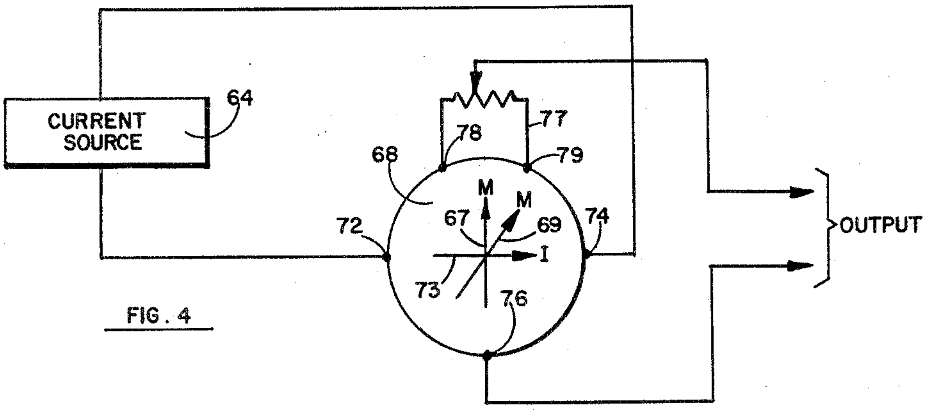
FIG. 4 is a schematic connection of the planar Hall generator used in the device of FIG. 3.

Offset voltages of a predetermined magnitude and polarity may be observed by moving terminals 28, 30, 36, and 38. Output terminals may, alternatively, be connected to films 16 and 18 in the manner shown in FIG. 4. In FIG. 4, output terminal 76 is arbitrarily positioned. Terminals 78 and 79 are positioned on different current flow lines than terminal 76. Terminals 78 and 79 need not be on the same current flow line. Terminals 78 and 79 are positioned on different offset voltage equipotential lines on opposite sides of the offset equipotential line that intersects terminal 76. A potentiometer 77 is connected between terminals 78 and 79. The slider of potentiometer 77 may be adjusted until no offset voltage, or a predetermined offset voltage appears at the output of the device. The latter result is desirable in some conditions when the utilization device has its own offset voltage, which is to be compensated.

Referring back to FIGS. 1 and 2, as the internal magnetization of films 16 and 18 is caused to turn by the influence of the magnetic field of magnets 10 and 12, a planar Hall voltage is generated between terminals 28 and 30, this planar Hall voltage being sinusodidally related to the angle of rotation of shaft 14 and magnets 10 and 12. Due to the 45° relation, the voltage generated between terminals 36 and 38 is cosinusoidally related to the angle of shaft 14 and magnets 10 and 12. If magnets 10 and 12 saturate films 16 and 18, the planar Hall voltage between terminals 28 and 30 is proportional to the sine of twice the angle of rotation and the voltage between terminals 36 and 38 is proportional to the cosine of twice the angle of rotation of shaft 14.

Figure 3:
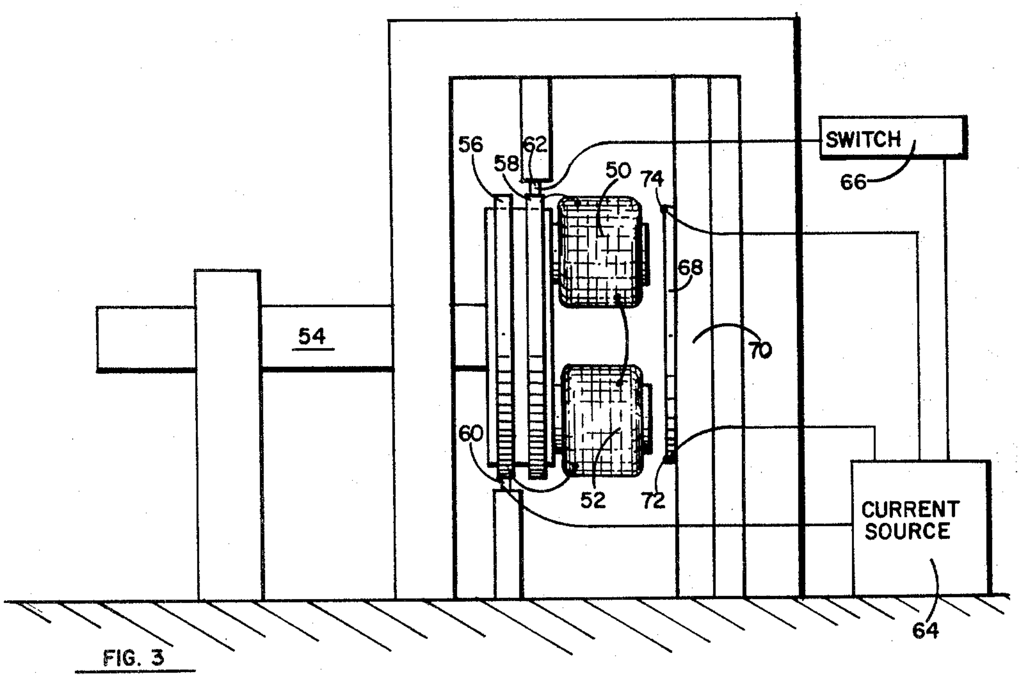
FIG. 3 is a device in accordance with this invention adapted and connected as a function generator.

In FIGS. 3 and 4, a pair of electromagnets 50 and 52 are symmetrically mounted across the diameter of a rotatable shaft. Electromagnets 50 and 52 are connected to receive current through slip rings 56 and 58 and brushes 60 and 62 from current source 64. Switch means 66 are connected in series with the coils of electromagnets 50 and 52 to allow electromagnets 50 and 52 selectively to be energized.

A thin film 68 of ferro-magnetic material is mounted upon a nonconductive and a dimensionally stable support means 70. A current I is conducted through film 68 and from terminal 72 to terminal 74. The position and connection of terminals 76, 77, and 78 are described above.

When switch 66 is closed, magnets 50 and 52 are energized to apply a torque to the internal magnetization M of film 68 to rotate M from its relaxed position 67 into a position 69. The rotation of the internal magnetization causes a planar Hall voltage to appear between terminals 76 and the center tap of potentiometer 77. By limiting the amount of allowable rotation of magnets 50 and 52, the voltage between the output terminals may be limited to the substantially linear portion of the sinusoidal output waveform. When switch 66 is opened, the magnetic field is released, which allows the internal magnetization of film 68 to snap back to its easy direction 67. This resets the output voltage to a predetermined value that depends upon the relation between the normal current flow and the normal orientation of the internal magnetization. Magnets 50 and 52 should be limited in their rotation so that if said magnets are not aligned with the easy direction of magnetization 67 when energy is supplied to them, the internal magnetization will not reverse polarity due to wall motion.

Thus the device of this invention is a function generator which is adapted selectively to generate a voltage which is a function of the rotation of a shaft. The function generator of this invention is also particularly adapted to be used as a resolver.

Although the device of this invention has been described in detail above it is not intended that the description should be by way of limitation but only in accordance with the spirit and scope of the appended claims.

I claim:

1. In combination: a thin film of ferro-magnetic material; electrical current means, connected to cause current to flow from one edge to another in said film; output terminal means connected to said film to measure planar Hall effect voltage; means for producing a magnetic field in the plane of said film; means for rotating said magnetic field producing means around an axis perpendicular to the plane of said film to rotate the internal magnetization of said film to produce a planar Hall-effect voltage at said output terminal means.

2. The combination comprising
a film of magnetic material capable of having an internal magnetization in the plane of said film;
means for causing a flow of electric current in the plane of said film from one edge to another edge of said film;
means for producing a magnetic field in the plane of said film; and
means for rotating said magnetic-field-producing means and causing rotation of said internal magnetization—whereby a planar Hall-effect voltage is produced in the plane of said film.

3. The combination comprising
a film of magnetic material having an easy-to-magnetize direction, and capable of having an internal magnetization produced in said easy-to-magnetize direction and in the plane of said film;
means for causing a flow of electric current in the plane of said film from one edge to another edge of said film;
means for producing a magnetic field in the plane of said film;
means for rotating said magnetic-field-producing means and causing rotation of said internal magnetization—whereby a planar Hall-effect voltage is produced in the plane of said film; and
output terminal means for obtaining said planar Hall-effect voltage—whereby said planar Hall-effect voltage may be applied to a utilization device.

4. The combination of claim 3 wherein said magnetic-field-producing means comprises permanent magnets—whereby rotation of said permanent magents would produce a sinusoidal planar Hall-effect output voltage.

5. The combination of claim 3 wherein said magnetic-field-producing means produces a magnetic field of such strength as to saturate said film—whereby rotation of said magnetic-field-producing means would produce a sinusoidal planar Hall-effect output voltage whose frequency is twice the frequency of rotation of said magnetic-field-producing means.

6. The combination of claim 3 wherein said magnetic-field-producing means produces a magnetic field of such strength as not to saturate said film—whereby rotation of said magnetic-field-producing means would produce a sinusoidal planar Hall-effect output voltage whose frequency is equal to the frequency of rotation of said magnetic-field-producing means.

7. The combination of claim 3 wherein said magnetic-field-producing means comprises electro-magnets—whereby rotation of said electro-magnets would produce a sinusoidal planar Hall-effect output voltage.

8. The combination comprising
a film of magnetic material capable of having an internal magnetization in the plane of said film;
means for causing a flow of electric current in the plane of said film from one edge to another edge of said film;
means for producing a magnetic field in the plane of said film;
means for continuously rotating said magnetic-field-producing means and causing rotation of said internal magnetization to produce a sinusoidal planar Hall-effect voltage in the plane of said film; and
output terminal means for obtaining said planar Hall-effect voltage—whereby said planar Hall-effect voltage may be applied to a utilization device.

9. The combination comprising
a film of magnetic material capable of having an internal magnetization produced in the plane of said film;
means for causing a flow of electric current in the plane of said film from one edge to another edge of said film;
electro-magnetic means for producing a magnetic field in the plane of said film;
means for rotating said electro-magnetic magnetic-field-producing means and causing rotation of said internal magnetization—whereby a sinusoidal planar Hall-effect voltage would be produced in the plane of said film;
means for energizing said electro-magnetic magnetic-field-producing means for only the linear portion of said sinusoidal planar Hall-effect voltage; and
output terminal means for obtaining said planar Hall-effect voltage—whereby said planar Hall-effect voltage may be applied to a utilization device.

10. The combination comprising
a film of magnetic material having an easy-to-magnetize direction, and having an internal magnetization produced in the plane of said film in said easy-to-magnetize direction;
means for causing a flow of electric current in the plane of said film from one edge to another edge of said film;
output terminal means for obtaining a planar Hall-effect voltage;
means for establishing a predetermined value for said quiescent planar Hall-effect voltage;
electro-magnetic means for producing a magnetic field in the plane of said film;
means for rotating said electro-magnetic magnetic-field-producing means and causing rotation of said internal magnetization from said easy-to-magnetize direction—whereby a sinusoidal planar Hall-effect voltage would be produced in the plane of said film;
means for energizing said electro-magnetic magnetic-field-producing means to produce a changing planar Hall-effect voltage; and
means for de-energizing said electro-magnetic magnetic-field-producing means to reset said planar Hall-effect voltage to said predetermined value.

11. The combination of claim 10 wherein said means for establishing said predetermined value comprises means for including an offset voltage.

12. The combination comprising
a first film of magnetic material capable of having an internal magnetization in the plane of said film;
means for causing a flow of electric current in the plane of said first film from one edge to another edge of said film, said current flow through said first film having a given direction;
a second film of magnetic material capable of having an internal magnetization in the plane of said film;
means for causing a flow of electric current in the plane of said second film from one edge to another edge of said film, said current flow through said second film having a direction different from the direction of current flow through said first film;
means for producing a magnetic field in the planes of said films;
means for rotating said magnetic-field-producing means and causing simultaneous rotation of said internal magnetization of said first and second films to produce a planar Hall-effect voltage of different phase in the planes of said separate films; and
output terminal means on each film for obtaining said planar Hall-effect voltages.

13. The combination comprising
a substrate;

a first film of magnetic material positioned on one surface of said substrate, said first film being capable of having an internal magnetization produced in the plane of said first film;

means for causing a flow of electric current in the plane of said first film from one edge to another edge of said film, said current flow through said first film having a given direction relative to said substrate;

a second film of magnetic material positioned on the other surface of said substrate, said second film being capable of having an internal magnetization produced in the plane of said second film;

means for causing a flow of electric current in the plane of said second film from one edge to another edge of said second film, said current flow through said second film having a direction different from the direction of current flow through said first film;

means for producing a magnetic field in the plane of said films;

means for rotating said magnetic-field-producing means and causing simultaneous rotation of said internal magnetization of said first and said second films to produce different planar Hall-effect voltages in the planes of each said films; and output terminal means for obtaining said different planar Hall-effect voltages.

14. The combination of claim 13 wherein said different planar Hall-effect voltages have a sine-cosine relation.

15. The combination of claim 13 wherein said magnetic-field-producing means is capable of saturating said films, and said directions of current flow differ by 45 degrees.

References Cited in the file of this patent

UNITED STATES PATENTS

| | | |
|---|---|---|
| 2,551,265 | Hansen | May 1, 1951 |
| 3,037,199 | Grant | May 29, 1962 |

FOREIGN PATENTS

| | | |
|---|---|---|
| 1,025,157 | Germany | Feb. 27, 1958 |